(12) United States Patent
Oliver (10) Patent No.: US 7,420,469 B1
(45) Date of Patent: Sep. 2, 2008

(54) RFID TAG CIRCUITS USING RING FET

(75) Inventor: Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 273 days.

(21) Appl. No.: 11/489,019

(22) Filed: Jul. 18, 2006

Related U.S. Application Data (60) Provisional application No. 60/754,263, filed on Dec. 27, 2005.

(51) Int. Cl.
*G08B 13/14* (2006.01)

(52) U.S. Cl. .............. 340/572.4; 340/572.1; 343/700 R (58) Field of Classification Search .............. 340/572.4, 340/10.1, 572.1, 572.2, 572.5, 572.7, 700 MS, 340/700 R
See application file for complete search history.

(56) References Cited

U.S. PATENT DOCUMENTS

| | | |
|---|---|---|
| 5,430,441 A | 7/1995 | Bickley et al. |
| 5,771,021 A | 6/1998 | Veghte et al. |
| 6,078,259 A | 6/2000 | Brady et al. |
| 6,130,570 A | 10/2000 | Pan et al. |
| 2003/0234655 A1* | 12/2003 | Sarma et al. ................ 324/663 |
| 2006/0055620 A1* | 3/2006 | Oliver et al. ................ 343/876 |

* cited by examiner

*Primary Examiner*—Phung Nguyen
(74) *Attorney, Agent, or Firm*—Adorno & Yoss, LLC; Carl K. Turk

(57) ABSTRACT

A Radio Frequency IDentification (RFID) circuit for use in an RFID tag includes a FET semiconductor device that is coupled to antenna connections. The device can be part of a modulator, a demodulator, or a rectifier. A designated region for a first terminal (such as a drain or a source) is formed as an island completely surrounded by a gate structure, which minimizes parasitic effects. One or more designated regions for a second terminal (such as a source or a drain) outside the gate structure complete the FET device.

65 Claims, 7 Drawing Sheets

*RFID TAG CIRCUIT COMPONENTS*

*RFID TAG CIRCUIT COMPONENTS*

FIGURE 4

*SIGNAL PATH DURING R→T*

FIGURE 5A

*SIGNAL PATH DURING T→R*

FIGURE 5B

RFID TAG CIRCUIT COMPONENTS

FIGURE 6

RING FET LAYOUT

FIGURE 7

RING FET SCHEMATIC

FIGURE 9

FET STRUCTURE

FIGURE 8

*RING FET LAYOUT*

FIGURE 10

*RING FET LAYOUT*

FIGURE 11

FIGURE 12  *RING FET LAYOUT*

FIGURE 13  *RING FET LAYOUT*

*RING FET SCHEMATIC*

RFID TAG CIRCUITS USING RING FET

RELATED APPLICATIONS

This utility patent application claims the benefit of U.S. Provisional Application Ser. No. 60/754,263 filed on Dec. 27, 2005, which is hereby claimed under 35 U.S.C. §119(e). The provisional application is incorporated herein by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

In typical applications, efficiency for circuits of an RFID tag such as modulators, demodulators, and especially rectifiers, is desired. Because of a tag's small size, the effect of parasitic interference is a major challenge in RFID tag design. Particularly the rectifier contributes a majority of the total parasitics.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to RFID circuits for use in RFID tags. The circuit includes a FET semiconductor device coupled to antenna connections. The device can be part of a modulator, a demodulator, or a rectifier. A region for a first terminal (such as a drain or a source) is formed as an island completely surrounded by a gate structure, which minimizes parasitic effects. One or more regions for a second terminal (such as a source or a drain) outside the gate structure complete the FET device.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

DETAILED DESCRIPTION

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

Figure 1:
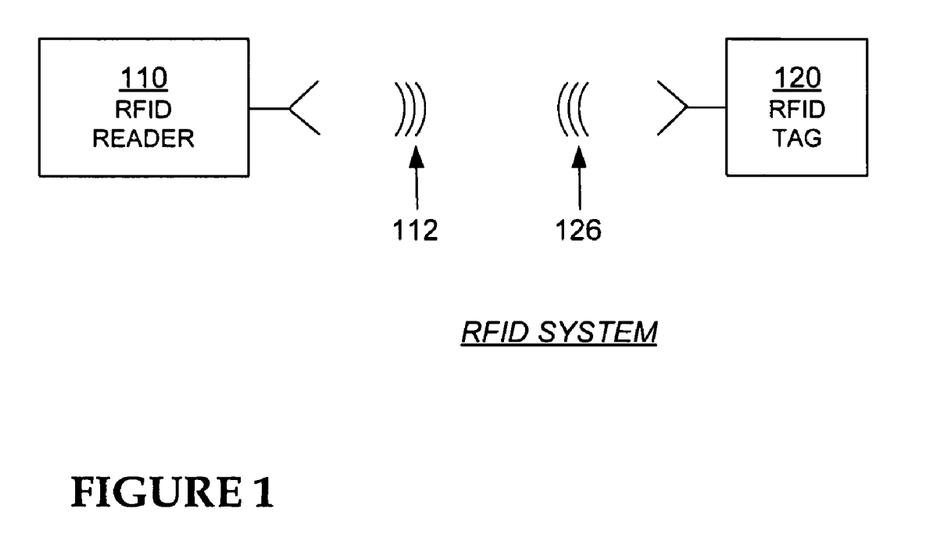
FIG. 1 is a block diagram of components of an RFID system.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
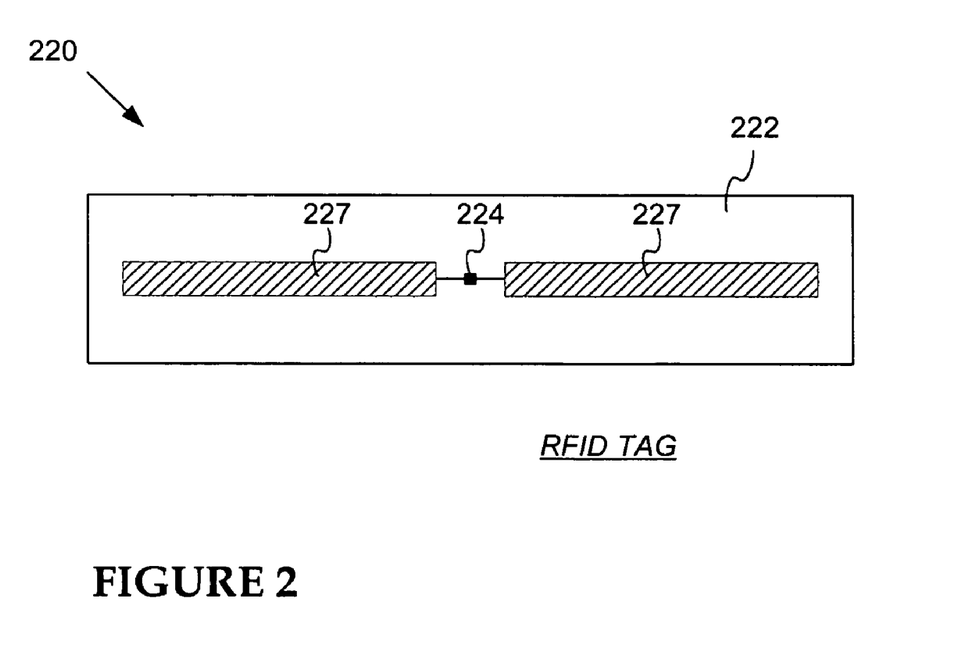
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in this figure).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
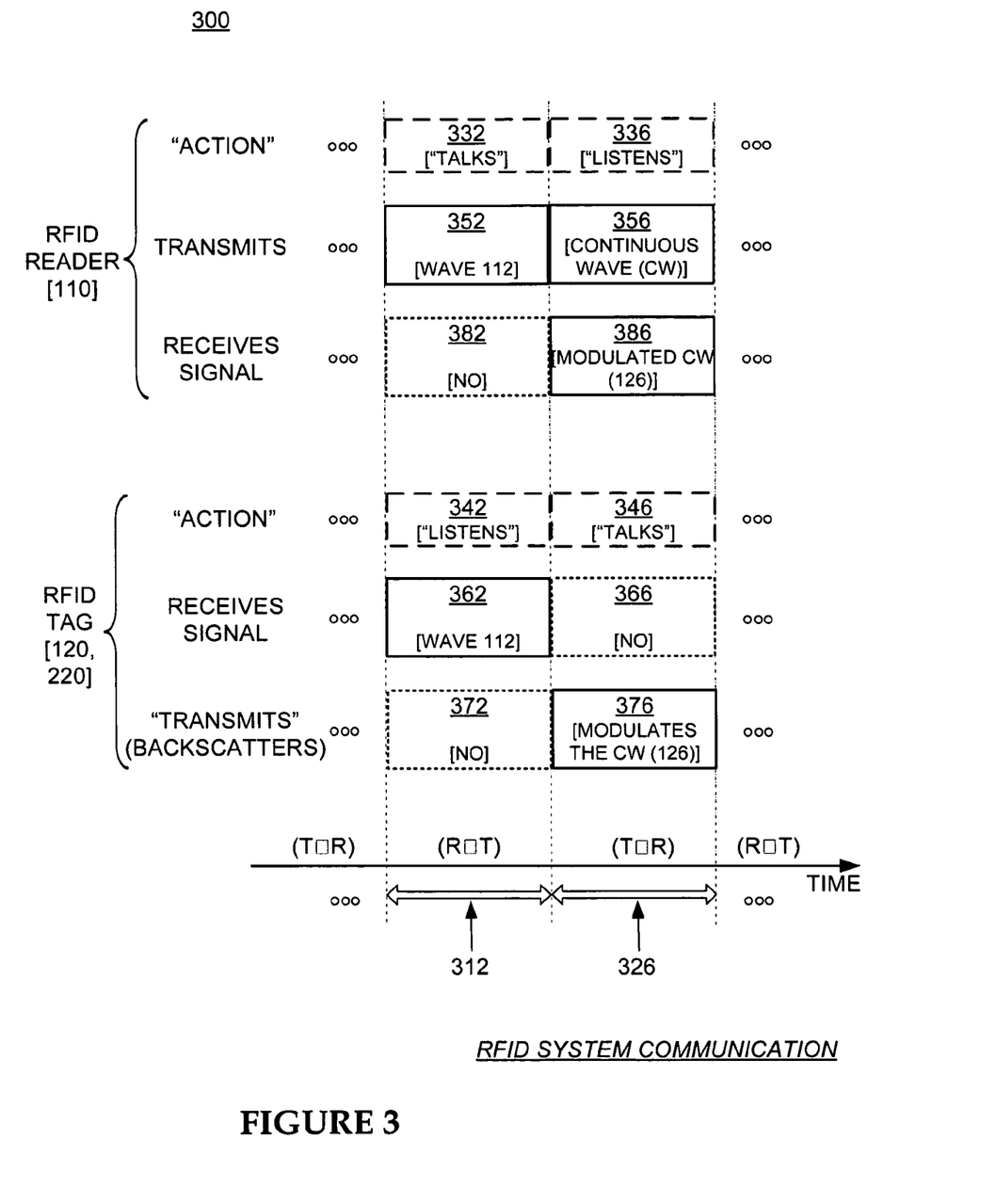
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
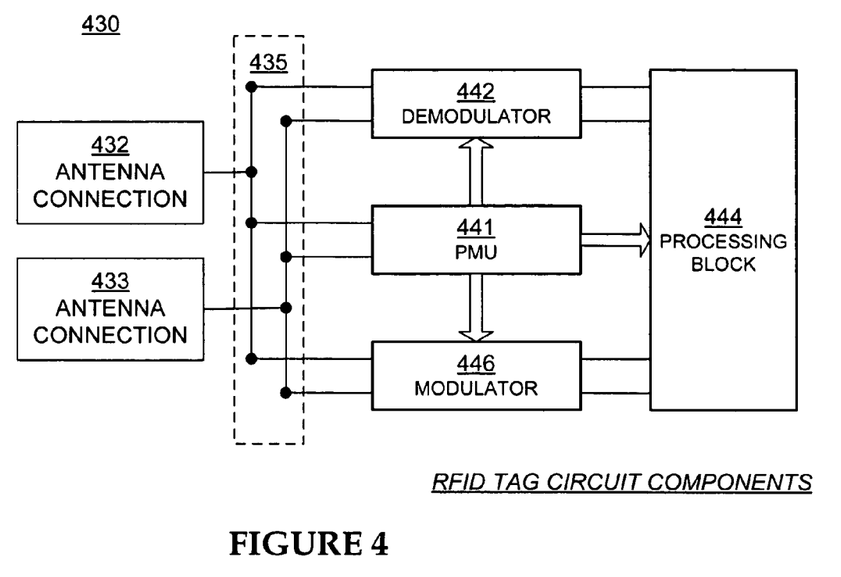
FIG. 4 is a block diagram of an implementation of an electrical circuit formed in an IC of the tag of FIG. 2.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more than two antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both of R→T sessions (when the received RF wave carries a signal) and T→R sessions (when the received RF wave carries no signal).

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

It will be recognized at this juncture that circuit 430 can also be the circuit of an RFID reader according to the invention, without needing PMU 441. Indeed, an RFID reader can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session, in treating a signal. The different operations are described below.

Figure 5A:
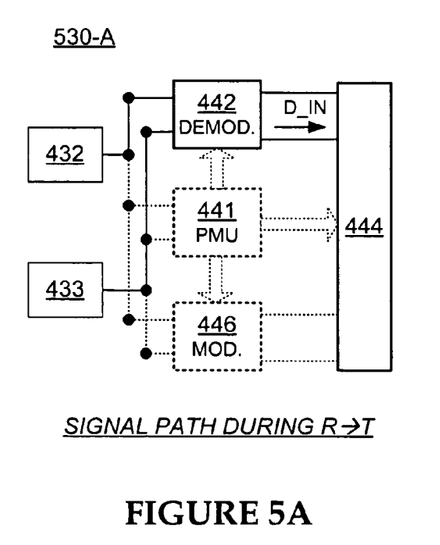
FIG. 5A is the block diagram of FIG. 4, modified to emphasize a signal operation during a R→T session of FIG. 3.

FIG. 5A shows version 530-A of circuit 430 of FIG. 4. Version 530-A shows the components of circuit 430 for a tag, further modified to emphasize a signal operation during a R→T session (receive mode of operation) during time interval 312 of FIG. 3. An RF wave is received from antenna connections 432, 433, a signal is demodulated from demodulator 442, and then input to processing block 444 as D_IN. In one embodiment according to the present invention, D_IN may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
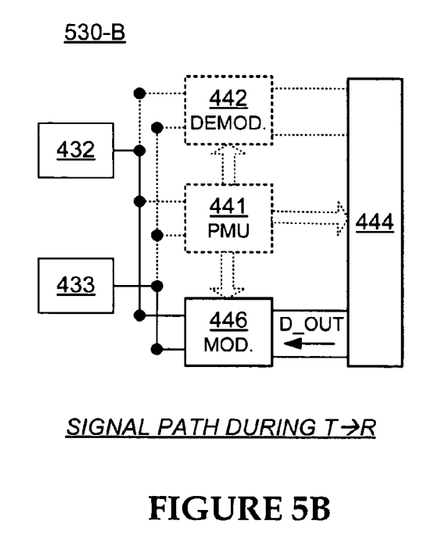
FIG. 5B is the block diagram of FIG. 4, modified to emphasize a signal operation during a T→R session of FIG. 3.

FIG. 5B shows version 530-B of circuit 430 of FIG. 4. Version 530-B shows the components of circuit 430 for a tag, further modified to emphasize a signal operation during a T→R session during time interval 326 of FIG. 3. A signal is output from processing block 444 as D_OUT. In one embodiment according to the present invention, D_OUT may include a transmission stream of symbols. D_OUT is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

As mentioned previously, parasitic losses due to the tag's relatively small size, interference of other wireless signals, and the like, can result in a reduction of efficiency of these circuits. This may be significant especially in the rectifier circuit for which an optimum RF to DC power conversion efficiency is desired. Thus, a parasitic management strategy that minimizes loading of RF input port is advantageous for circuits of RFID tags. Examples are now described.

Figure 6:
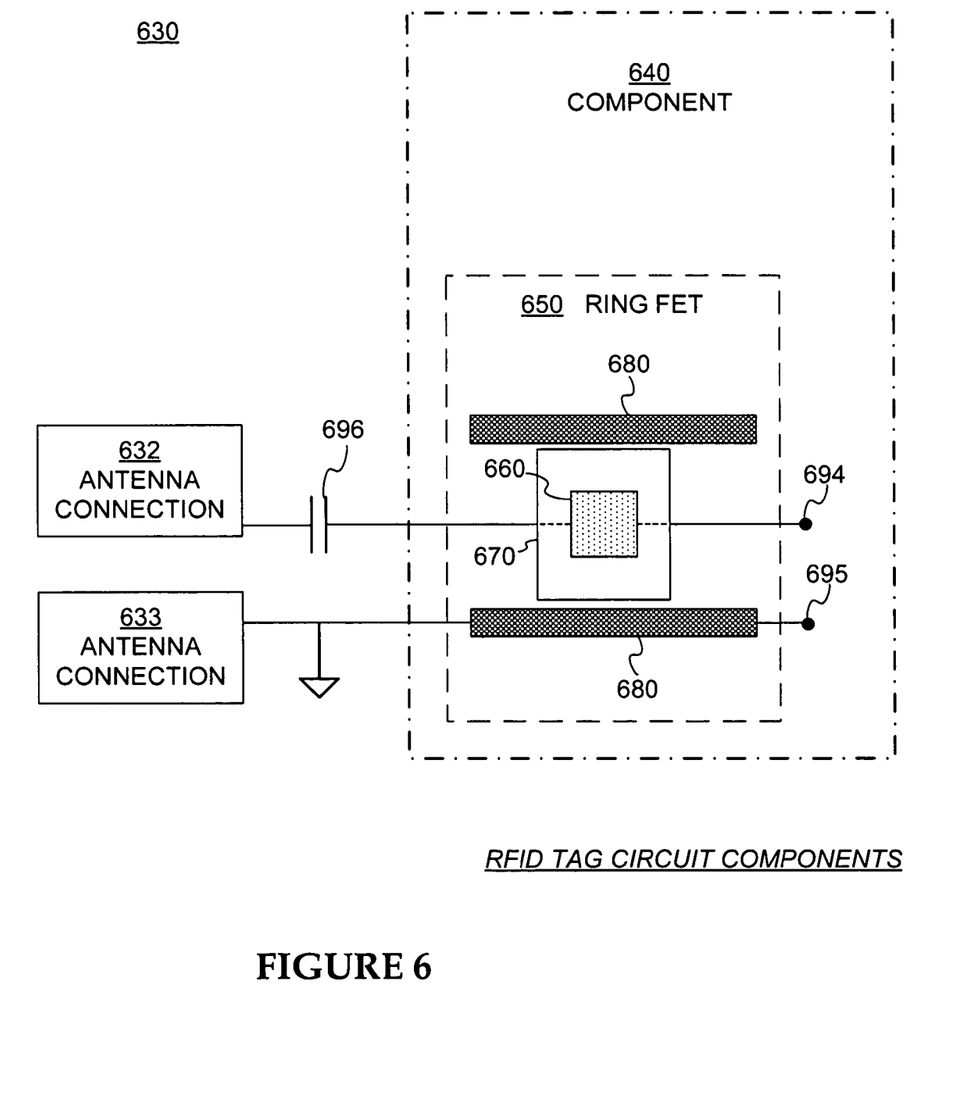
FIG. 6 is a hybrid schematic and block diagram of an RFID tag circuit with a component that uses a semiconductor device according to embodiments.

FIG. 6 is a hybrid block schematic and diagram 630 of an RFID tag circuit with a component that uses a semiconductor device. A component 640 of a tag circuit is included, which can be part of a rectifier in PMU 441, demodulator 442, or modulator 446.

Component 640 includes a circuit device 650, which is also called a ring FET 650. The use of ring FET 650 may reduce a rectifier's RF parasitic loading, and increase its switching effectiveness. In addition, it can reduce an off-state loading in a modulator or demodulator circuit.

Antenna connections 632, 633 are similar to antenna connections 432, 433. They provide for coupling the tag antenna(s) to component 640.

In a typical implementation, one of the antenna connections (e.g. 633) may be grounded, i.e. coupled to a node that is considered a ground reference node. In this case, then, the parasitic interference at this port becomes negligible due to grounding. Antenna connection 632 is then not grounded and provides coupling to component 640 directly or via capacitor 696.

Ring FET 650 is now described in more detail. It may be made according to Metal Oxide Semiconductor FET (MOSFET) technology, Complementary MOSFET (CMOS) technology, or other related technologies, as will be evident to a person skilled in the art.

Ring FET 650 is preferably provided on a semiconductor substrate, which is not shown separately in FIG. 6. Ring FET 650 also includes an insulating layer on the substrate, which is not shown separately in FIG. 6.

Ring FET 650 includes a first designated terminal region 660 and a second designated terminal region 680. As will be understood, each of regions 660 and 680 may be distributed in one or more localities on the substrate.

Regions 660 and 680 are doped to be conductive. In some embodiments, region 660 is configured as a drain, while region 680 is configured as a source, as is preferred. In other embodiments, region 660 is configured as a source, while region 680 is configured as a drain.

Ring FET 650 includes a conductive gate structure 670 on the insulating layer. Gate structure 670 has a footprint on the substrate that completely surrounds the first designated terminal region 660, while separating it from the second designated terminal region 680. Hence the name: ring FET.

As with ordinary FET devices, conduction between regions 660 and 680 depends on a control voltage that is applied to gate structure 670. In some embodiments, this control voltage is adjustable. In addition, a bias voltage may be applied between gate structure 670 and one of regions 660 and 680.

Regions 660 and 680 are coupled respectively to the first and the second antenna connections 632, 633. This way ring FET 650 is closely coupled to the antenna, from where wireless signals are exchanged for the tag. Past ring FET 650, signals from the antenna are provided to device 650 at nodes 694, 695.

It will be appreciated how ring FET device 650 suppresses parasitics. Parasitic interference, typically, reaches a drain terminal of a FET device through the ungrounded one of antenna connections 632, 633. Ring FET 650, however, has the ungrounded terminal completely surrounded by gate structure 670. This reduces to zero a perimeter to area ratio of the drain terminal, because it results in zero perimeter length, where perimeter length is defined as non-gate, inactive edge of diffusion region. This in turn reduces the undesirable effect of the parasitics at nodes 694, 695.

In the embodiment of FIG. 6, second designated terminal region 680 is laid out as two regions on either side of gate structure 670, which can be symmetric. Typically, the parasitics do not have a degrading effect on such a terminal connection. Thus, second designated terminal region 680 can have a large area or perimeter without a significant penalty on performance.

A shape and placement of terminal regions is not limited by the illustrations. A number of those can be implemented without departing from a scope and spirit of the invention. Some examples of these are now described.

Figure 7:
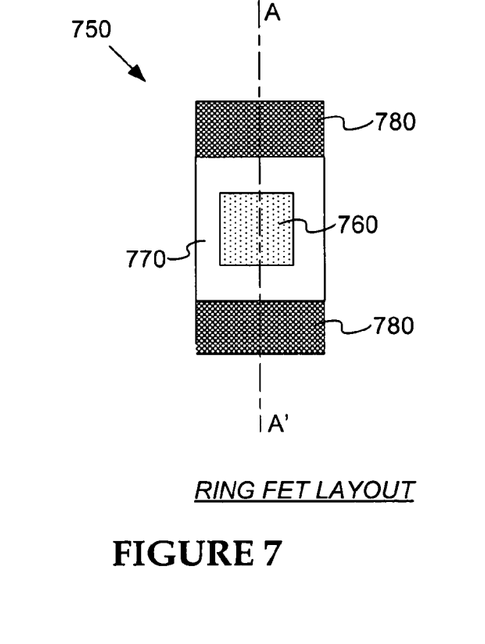
FIG. 7 is a diagram of a basic layout portion of the semiconductor device of FIG. 6, implemented as a ring Field Effect Transistor (FET)

FIG. 7 is a diagram of a basic layout portion 750 of ring FET 650. A first designated terminal region 760 is completely surrounded by a gate structure 770, thereby providing for a zero perimeter length. Second terminal designated regions 780 are laid out adjacent to gate structure 770, on two sides.

It will be observed that first designated region 760 is substantially rectangularly shaped. In fact, it can be shaped substantially like a square. In some instances there are chamfers at corners of the substantially square shape, not shown in FIG. 7. If the chamfers are large, then first designated region 760 is shaped substantially like an octagon, but with its sides not necessarily being equal.

An axis line A-A' is shown also in diagram 750 to indicate a direction of the cross-section diagram of the following figure.

Figure 8:
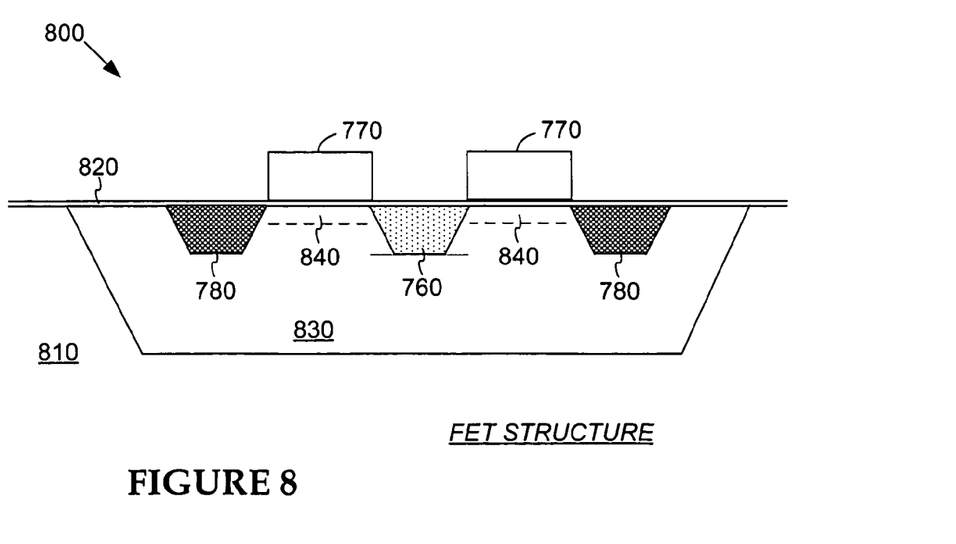
FIG. 8 is a cross-sectional diagram along line A-A' of FIG. 7, showing how the layout portion of FIG. 7 can be implemented.

FIG. 8 is a cross-section diagram 800 along line A-A' of the diagram of FIG. 7, showing how basic layout portion 750 can be implemented.

Device 810 includes a substrate 830, which may be a semiconductor substrate. An insulating layer 820 is formed on substrate 830.

Substrate 830 may be an elementary semiconductor such as silicon, germanium, or diamond. Substrate 830 may also comprise a compound semiconductor such as silicon carbide, gallium arsenide, indium arsenide, and indium phosphide. Substrate 830 may also comprise an alloy semiconductor such as silicon germanium, silicon germanium carbide, gallium arsenic phosphide, and gallium indium phosphide. According to some embodiments, substrate 830 may comprise a semiconductor-on-insulator (SOI) structure. According to other embodiments, substrate 830 may comprise a p-type doped region and/or an n-type doped region. For example, substrate 830 may include p-type dopants for an n-type metal-oxide-semiconductor (NMOS) transistor or n-type dopants for a p-type metal-oxide-semiconductor (PMOS) transistor.

Within substrate 830, the above-mentioned designated terminal regions 780 and 760 are formed by doping. Doping can be in a predefined profile and implant concentration for optimized device performance according to the desired application. Region 760 defines one or more channels 840 between itself and regions 780.

Gate structure 770 is formed substantially over channel(s) 840 on insulating layer 820. While it is not apparent in the cross-section diagram, gate structure 770 in portion 750 of FIG. 7 is formed as a contiguous structure, such as a ring (as can be seen in diagram 750). It is just that line A-A' is located such that it intersects gate structure 770 twice.

In a ring FET, sometimes also referred to as evaporated metal pseudo-FET, it is desired to make an ohmic contact to the carrier type created by the FET behavior regardless of the doping type of the silicon layer. Thus, Er- and Ti-based contacts may be made for obtaining the electron channel properties created by FET action regardless of whether the material is p-type or n-type. Similarly, Au—, Al—, Ag—, Mg—, and Pt-based contacts may be used to obtain the hole channel properties created by FET action whether the material is n-type or p-type.

Figure 9:
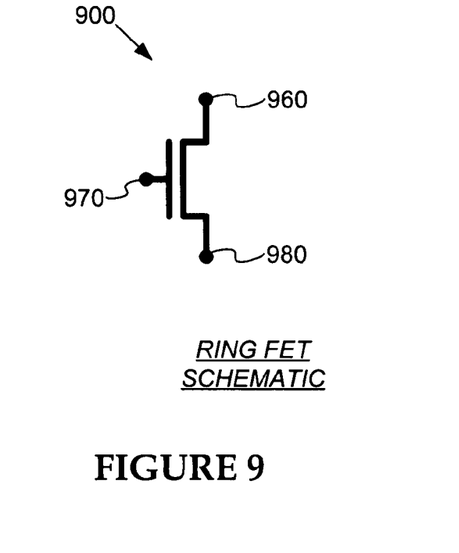
FIG. 9 is a schematic diagram of a FET device that arises in one embodiment of the portion of FIG. 7 that is considered by itself.

FIG. 9 is schematic diagram of a FET device 900 that arises in one embodiment of portion 750 of FIG. 7, if it is considered by itself as a standalone device. Device 900 includes terminals 960, 980, which are coupled to designated terminal regions 760 and 780, respectively, such as by ohmic contacts. Device 900 also includes a gate terminal 970, which is coupled to gate structure 770, such as by an ohmic contact. Terminal 960 can be the drain, while terminal 980 can be the source, as is preferred. But terminal 960 can instead be the source, while terminal 980 can be the drain. Also, depending on the configuration, the ohmic contacts can be distributed as required.

The gate structure may have a shape with two oblong parallel lines interconnected by perpendicular segments, like a ladder and its steps. The ladder and the steps can define between them islands that are substantially rectangularly shaped. In these embodiments, the first designated terminal region may be formed within at least one of the islands, while at least a portion of the second designated terminal region may be formed in a space outside the parallel lines. An example is now described.

Figure 10:
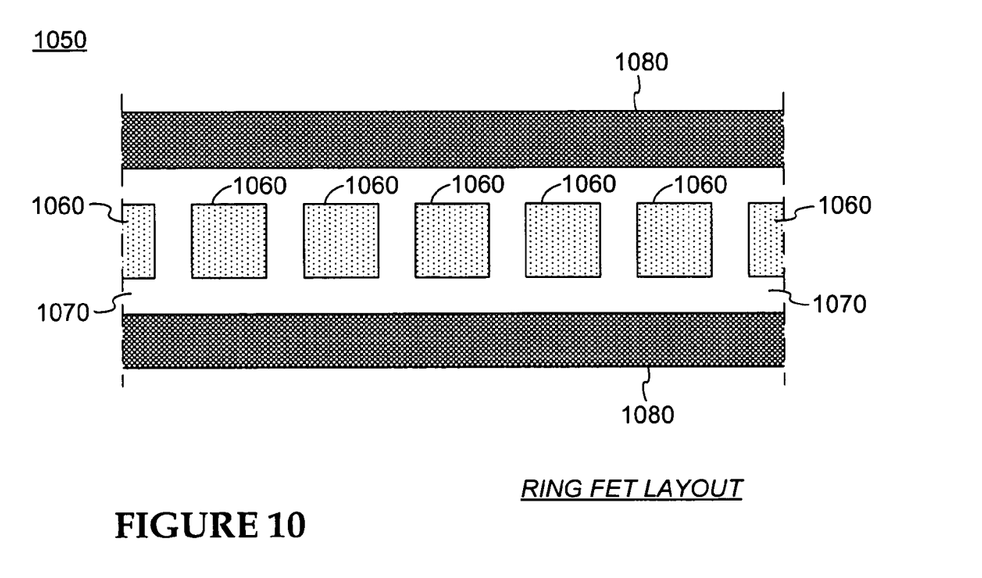
FIG. 10 is a diagram of an example of a fuller layout using the basic layout portion of FIG. 7.

FIG. 10 is a diagram of an example of a fuller layout 1050, which uses using the basic layout portion 750 of FIG. 7. A gate structure 1070 has a shape with two oblong parallel lines interconnected by perpendicular segments, like a ladder and its steps. The ladder and the steps can define islands between them. These islands are rectangularly shaped, in these embodiments.

A first designated terminal region has portions 1060 that are formed within the islands. For convenience, these portions 1060 can themselves be called first designated terminal regions 1060. Thus, gate structure 1070 is a contiguous structure that forms "rings" around the islands with first designated terminal regions 1060. Even though they are separated, different regions 1060 can be interconnected by conductors, via their ohmic contacts, in configurations described later in this document.

A second designated terminal region has portions 1080 that are formed in a space outside the parallel lines of gate structure 1070. For convenience, these portions 1080 can themselves be called second designated terminal regions 1080. Even though they are separated, regions 1080 are interconnected by conductors, via their ohmic contacts.

In some instances, as also seen above, all of the second designated terminal regions 1080 are formed outside the parallel lines of gate structure 1070. In some other instances, a portion of the second designated terminal region is formed within at least one of the islands. An example is now described.

Figure 11:
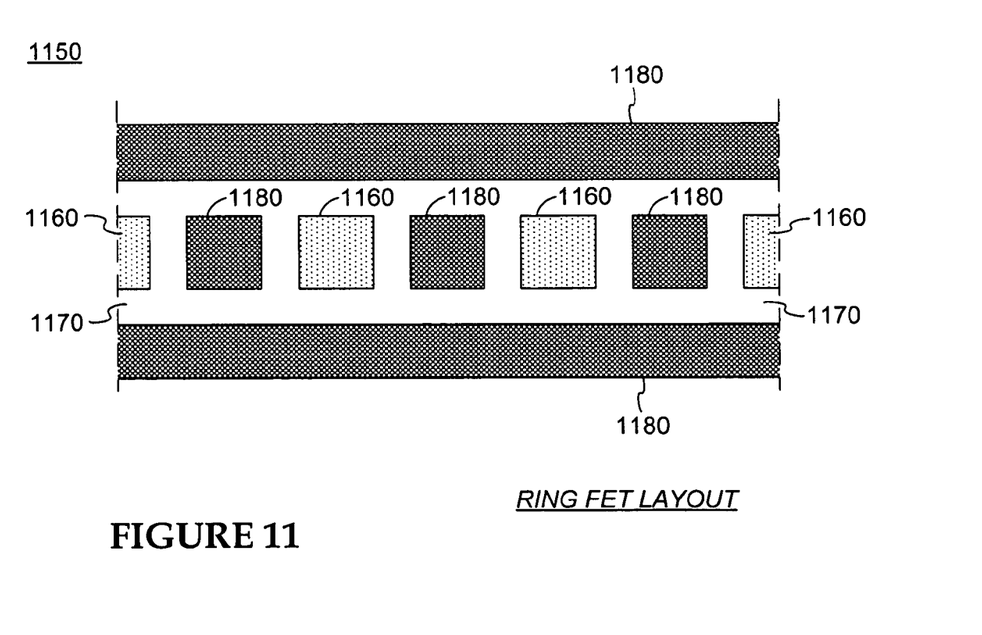
FIG. 11 is a diagram of a layout of another example of a fuller layout of the basic layout portion of FIG. 7.

FIG. 11 is a diagram of another example of a fuller layout 1150 of the basic layout portion 750 of FIG. 7. A gate structure 1170 is ladder like, similarly to gate structure 1070 of layout 1050. It defines islands where both first designated terminal regions 1160 and second designated terminal regions 1180 are formed. In addition, more second designated terminal regions 1180 are formed in a space outside the parallel lines of gate structure 1170.

In the example of layout 1150, first and second designated terminal regions 1160 and 1180 are formed on alternating islands. This is not necessary. In fact, similar regions can be contained within consecutive islands, as will be seen below.

Figure 12:
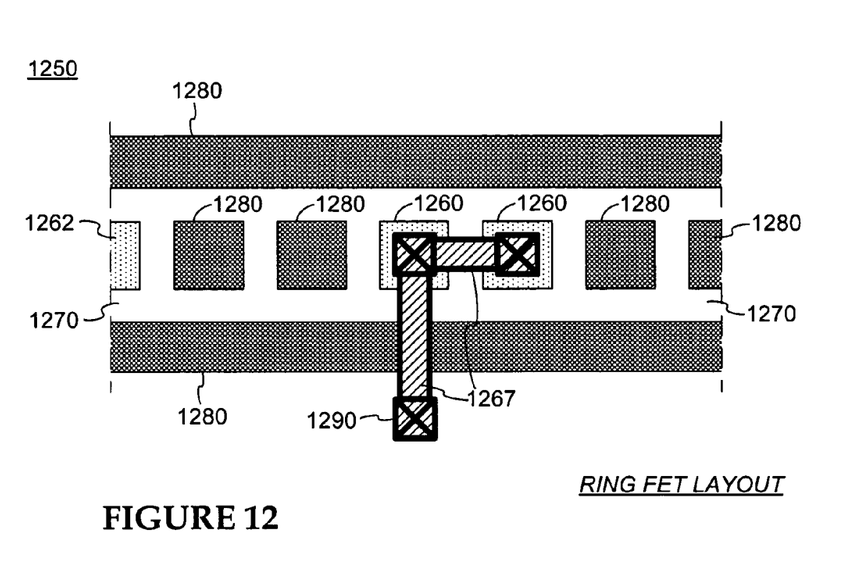
FIG. 12 is a diagram of a layout of another example of a fuller layout of the basic layout portion of FIG. 7, where portions of a designated region are interconnected by a conductor.

FIG. 12 is a diagram of another example of a fuller layout 1250 of the basic layout portion of FIG. 7. A gate structure 1270 is ladder like, similarly to gate structure 1170 of layout 1150. It defines islands where both first designated terminal regions 1260 and second designated terminal regions 1280 are formed. In addition, more second designated terminal regions 1280 are formed in a space outside the parallel lines of gate structure 1270.

It will be observed that at least two regions 1260 are in consecutive islands. A reason for such a configuration will be evident from the example below.

As described above, different portions of the first designated region can be interconnected in different configurations. Where two such portions are so interconnected, they are maintained at the same potential, which is effectively a node.

As can be further seen in FIG. 12, conductors 1267 interconnect two portions of first designated region 1260. In addition, conductors 1267 interconnect these two portions with another contact 1290. When all portions of a designated terminal region are interconnected, the device that results behaves similarly to FET 900 of FIG. 9.

In other embodiments, different portions of the first designated region are not interconnected. A different device results, as will be seen from the example below.

Figure 13:
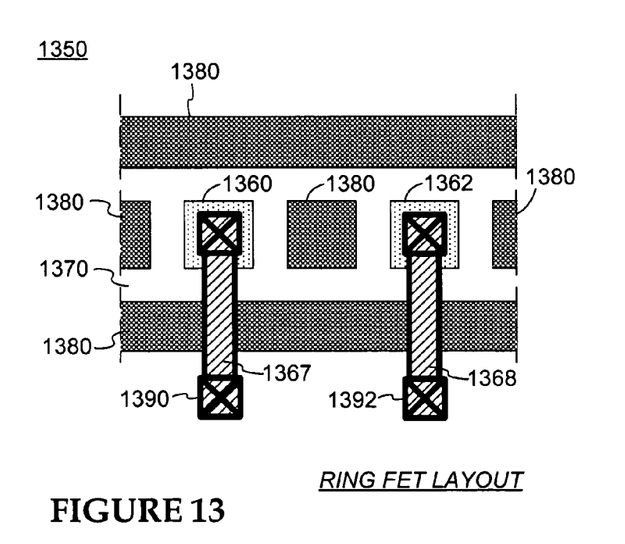
FIG. 13 is a diagram of a layout of another example of a fuller layout of the basic layout portion of FIG. 7, where two portions of a designated region are not interconnected.

FIG. 13 is a diagram of another example of a fuller layout 1350 of the basic layout portion of FIG. 7. A gate structure 1370 is ladder like, similarly to gate structure 1170 of layout 1150. It defines islands where both first designated terminal regions 1360, 1362 and second designated terminal regions 1380 are formed. In addition, more second designated terminal regions 1380 are formed in a space outside the parallel lines of gate structure 1370.

Regions 1360, 1362 can be made similarly to each other, or differently depending on the desired result. In some instances, they can be made identically to each other. For example, they may be of different size, to enable two different drain-source characteristics in the same device.

The interconnections of regions 1360, 1362 are of interest. Region 1360 is interconnected to an ohmic contact 1390 via a conductor 1367. Region 1362 is interconnected to an ohmic contact 1390 via a conductor 1368. Yet these regions 1360, 1362 are not interconnected with each other. As such, they are at different potentials in operation, namely not at the same node. This results in a multi-drain or multi-source FET device, depending on the configuration. The exact number of multiple sources, or multiple drains, can be as desired.

Figure 14:
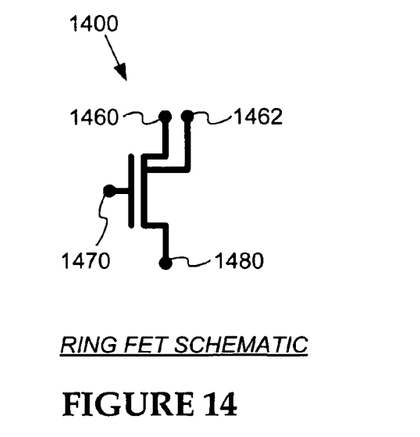
FIG. 14 is a schematic diagram of a FET device that is derived from the layout of FIG. 13.

FIG. 14 is a schematic diagram of a FET device 1400 that can be made from the layout of FIG. 13. Device 1400 is a dual source or dual drain device, depending on the configuration.

Device 1400 includes terminals 1460, 1462, 1480, which are coupled to designated terminal regions 1360, 1362 and 1380, respectively, such as by ohmic contacts. Device 1400 also includes a gate terminal 1470, which is coupled to gate structure 1470, such as by an ohmic contact (not shown). Terminals 1460, 1462 can be the dual drains, while terminal 1480 can be the source, as is preferred. But terminals 1460, 1462 can instead be the dual sources, while terminal 1480 can be the drain. Also, depending on the configuration, the ohmic contacts can be distributed as required.

The electrical circuit(s) described in this document can be manufactured in any number of ways, as will be appreciated by the persons skilled in the art. One such way is as integrated circuit(s), as described below.

Schematic-type inputs can be provided for the purpose of preparing one or more layouts. These inputs can include as little as a schematic of a circuit, to more including relative sizes of circuit components and the like, as will be appreciated by a person skilled in the art for such inputs. These inputs can be provided in any suitable way, such as merely in writing, or electronically, as computer files and the like. Some of these computer files can be prepared with the assistance of suitable design tools. Such tools often include instrumentalities for simulating circuit behaviors and the like.

These inputs can be provided to a person skilled in the art of preparing layouts. This, whether the person is within the same company, or another company, such as under a contract.

A layout can be prepared that embodies the schematic-type inputs by the person skilled in the art. The layout is itself preferably prepared as a computer file. It may be additionally checked for errors, modified as needed, and so on.

In the above, computer files can be made from portions of computer files. For example, suitable individual designs can be assembled for the electrical components and circuits indicated in the schematic-type inputs. The individual designs can be generated anew, or selected from existing libraries. In the layout phase, the assembled designs can be arranged to interoperate, so as to implement as integrated circuit(s) the electrical circuit(s) of the provided schematic-type inputs. These computer files can be stored in storage media, such as memories, whether portable or not, and the like.

Then a special type of computer file can be synthesized from the prepared layout, in a manner that incorporates the prepared layout, which has the embodied schematic-type inputs. Such files are known in the industry as IC chip design files or tapeout files, and express instructions for machinery as to how to process a semiconductor wafer, so as to generate an integrated circuit that is arranged as in the incorporated layout.

The synthesized tapeout file is then transferred to a semiconductor manufacturing plant, which is also known as a foundry, and so on. Transferring can be by any suitable means, such as over an electronic network. Or a tapeout file can be recorded in a storage medium, which in turn is physically shipped to the mask manufacturer.

The received tapeout file is then used by mask making machinery as instructions for processing a semiconductor wafer. The wafer, as thus processed, now has one or more integrated circuits, each made according to the layout incorporated in the tapeout file. If more than one, then the wafer can be diced to separate them, and so on.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A Radio Frequency Identification (RFID) circuit for use in an RFID tag having an antenna, comprising:
a first and a second antenna pads that can be coupled to the antenna; and
a component that includes a FET semiconductor device comprising:
a substrate having a first designated terminal region and a second designated terminal region, the first and the second designated terminal regions doped to be conductive and coupled respectively to the first and the second antenna pads;
an insulating layer on the substrate;
a conductive gate structure on the insulating layer, having a footprint on the substrate that completely surrounds the first designated terminal region and separates it from the second designated terminal region, and in which a conduction between the first and the second designated terminal regions depends on a control voltage provided to the gate structure.

2. The circuit of claim 1, in which
the FET semiconductor device is made according to Metal Oxide Semiconductor FET (MOSFET) technology.

3. The circuit of claim 1, in which
the FET semiconductor device is made according to Complementary MOSFET (CMOS) technology.

4. The circuit of claim 1, in which
the first designated terminal region is configured as a drain; and
the second designated terminal region is configured as a source.

5. The circuit of claim 1, in which
the first designated terminal region is configured as a source; and
the second designated terminal region is configured as a drain.

6. The circuit of claim 1, in which
the component is a modulator.

7. The circuit of claim 1, in which
the component is a demodulator.

8. The circuit of claim 1, in which
the component is a rectifier in a Power Management Unit.

9. The circuit of claim 8, in which
a bias voltage is adapted to be applied between the gate structure and one of the first region and the second region.

10. The circuit of claim 1, further comprising:
a capacitor coupled between the first designated terminal region and the first antenna pad.

11. The circuit of claim 1, in which
the second designated terminal region is coupled to a ground reference node.

12. The circuit of claim 1, in which
the first designated terminal region is substantially rectangularly shaped.

13. The circuit of claim 1, in which
the first designated terminal region is shaped substantially like a square.

14. The circuit of claim 1, in which
the first designated terminal region is shaped substantially like an octagon, but with its sides not necessarily being equal.

15. The circuit of claim 1, in which
the gate structure has a shape with two oblong parallel lines interconnected by perpendicular segments that between them define islands,
the first designated terminal region is formed within at least one of the islands, and
a portion of the second designated terminal region is formed in a space outside the parallel lines.

16. The circuit of claim 15, in which
the islands are shaped substantially rectangularly.

17. The circuit of claim 15, in which
all the second designated terminal region is formed outside the parallel lines.

18. The circuit of claim 15, in which
a portion of the second designated terminal region is formed within at least one of the islands.

19. The circuit of claim 15, in which
the first designated terminal region is formed within islands that alternate islands in which the second designated terminal region is formed.

20. The circuit of claim 15, in which
the first designated terminal region is formed within at least two consecutive islands.

21. The circuit of claim 1, in which
the first designated terminal region includes at least two portions that are separated by, and each is completely surrounded by, the gate structure, the two portions being coupled by a conductor.

22. The circuit of claim 1, in which
the first designated terminal region includes at least two portions that are separated by, and each is completely surrounded by, the gate structure, the two portions not being coupled by a conductor.

23. The circuit of claim 22, in which
the gate structure has a shape with two oblong parallel lines interconnected by perpendicular segments that between them define islands, and
a first one of the portions of the first designated terminal region is formed within at least one of the islands, and
a second one of the portions of the first designated terminal region is formed within at least another one of the islands.

24. An RFID tag, comprising:
an antenna; and
an integrated circuit including:
a first and a second antenna pads that are coupled to the antenna; and
a component that includes a FET semiconductor device including:
a substrate having a first designated terminal region and a second designated terminal region, the first and the second designated terminal regions doped to be conductive and coupled respectively to the first and the second antenna pads;
an insulating layer on the substrate;
a conductive gate structure on the insulating layer, having a footprint on the substrate that completely surrounds the first designated terminal region and separates it from the second designated terminal region, and in which a conduction between the first and the second designated terminal regions depends on a control voltage provided to the gate structure.

25. The tag of claim 24, in which
the FET semiconductor device is made according to Metal Oxide Semiconductor FET (MOSFET) technology.

26. The tag of claim 24, in which
the FET semiconductor device is made according to Complementary MOSFET (CMOS) technology.

27. The tag of claim 24, in which
the first designated terminal region is configured as a drain; and
the second designated terminal region is configured as a source.

28. The tag of claim 24, in which
the first designated terminal region is configured as a source; and
the second designated terminal region is configured as a drain.

29. The tag of claim 24, in which
the component is a modulator.

30. The tag of claim 24, in which
the component is a demodulator.

31. The tag of claim 24, in which
the component is a rectifier in a Power Management Unit.

32. The tag of claim 31, in which
a bias voltage is adapted to be applied between the gate structure and one of the first region and the second region.

33. The tag of claim 24, in which the component further includes:
a capacitor coupled between the first designated terminal region and the first antenna pad.

34. The tag of claim 24, in which
the second designated terminal region is coupled to a ground reference node.

35. The tag of claim 24, in which
the first designated terminal region is substantially rectangularly shaped.

36. The tag of claim 24, in which
the first designated terminal region is shaped substantially like a square.

37. The tag of claim 24, in which
the first designated terminal region is shaped substantially like an octagon, but with its sides not necessarily being equal.

38. The tag of claim 24, in which
the gate structure has a shape with two oblong parallel lines interconnected by perpendicular segments that between them define islands,
the first designated terminal region is formed within at least one of the islands, and
a portion of the second designated terminal region is formed in a space outside the parallel lines.

39. The tag of claim 38, in which
the islands are shaped substantially rectangularly.

40. The tag of claim 38, in which
all the second designated terminal region is formed outside the parallel lines.

41. The tag of claim 38, in which
a portion of the second designated terminal region is formed within at least one of the islands.

42. The tag of claim 38, in which
the first designated terminal region is formed within islands that alternate islands in which the second designated terminal region is formed.

43. The tag of claim 38, in which
the first designated terminal region is formed within at least two consecutive islands.

44. The tag of claim 24, in which
the first designated terminal region includes at least two portions that are separated by, and each is completely surrounded by, the gate structure, the two portions being coupled by a conductor.

45. The tag of claim 24, in which
the first designated terminal region includes at least two portions that are separated by, and each is completely surrounded by, the gate structure, the two portions not being coupled by a conductor.

46. The tag of claim 45, in which
the gate structure has a shape with two oblong parallel lines interconnected by perpendicular segments that between them define islands, and
a first one of the portions of the first designated terminal region is formed within at least one of the islands, and
a second one of the portions of the first designated terminal region is formed within at least another one of the islands.

47. A method comprising: providing schematic-type inputs for the purpose of preparing a layout that embodies the inputs, in which, if the layout is incorporated in a tapeout file that is used by mask making machinery as instructions for processing a semiconductor wafer, an integrated circuit for use in an RFID tag having an antenna will result on the wafer according to the inputs, comprising:
a first and a second antenna pads that can be coupled to the antenna; and
a component that includes a FET semiconductor device comprising:
a substrate having a first designated terminal region and a second designated terminal region, the first and the second designated terminal regions doped to be conductive and coupled respectively to the first and the second antenna pads;
an insulating layer on the substrate;
a conductive gate structure on the insulating layer, having a footprint on the substrate that completely surrounds the first designated terminal region and separates it from the second designated terminal region, and in which a conduction between the first and the second designated terminal regions depends on a control voltage provided to the gate structure.

48. The method of claim 47, in which
the FET semiconductor device is made according to Metal Oxide Semiconductor FET (MOSFET) technology.

49. The method of claim 47, in which
the FET semiconductor device is made according to Complementary MOSFET (CMOS) technology.

50. The method of claim 47, in which
the first designated terminal region is configured as a drain; and
the second designated terminal region is configured as a source.

51. The method of claim 47, in which
the first designated terminal region is configured as a source; and
the second designated terminal region is configured as a drain.

52. The method of claim 47, in which
the gate structure has a shape with two oblong parallel lines interconnected by perpendicular segments that between them define islands,
the first designated terminal region is formed within at least one of the islands, and
a portion of the second designated terminal region is formed in a space outside the parallel lines.

53. The method of claim 47, in which
the first designated terminal region includes at least two portions that are separated by, and each is completely surrounded by, the gate structure, the two portions being coupled by a conductor.

54. The method of claim 47, in which
the first designated terminal region includes at least two portions that are separated by, and each is completely surrounded by, the gate structure, the two portions not being coupled by a conductor.

55. The method of claim 47, further comprising:
preparing the layout that embodies the provided schematic type inputs.

56. The method of claim 55, further comprising:
synthesizing a tapeout file that incorporates the prepared layout.

57. The method of claim 56, further comprising:
operating mask making machinery according to the synthesized tapeout file.

58. An article comprising a machine-readable memory containing thereon instructions which, if executed by mask making machinery as instructions for processing a semiconductor wafer, an integrated circuit for use in an RFID tag having an antenna will result on the wafer, comprising:
a first and a second antenna pads that can be coupled to the antenna; and
a component that includes a FET semiconductor device comprising:
a substrate having a first designated terminal region and a second designated terminal region, the first and the second designated terminal regions doped to be conductive and coupled respectively to the first and the second antenna pads;
an insulating layer on the substrate;
a conductive gate structure on the insulating layer, having a footprint on the substrate that completely surrounds the first designated terminal region and separates it from the second designated terminal region, and in which a conduction between the first and the second designated terminal regions depends on a control voltage provided to the gate structure.

59. The article of claim 58, in which
the FET semiconductor device is made according to Metal Oxide Semiconductor FET (MOSFET) technology.

60. The article of claim 58, in which
the FET semiconductor device is made according to Complementary MOSFET (CMOS) technology.

61. The article of claim 58, in which
the first designated terminal region is configured as a drain; and
the second designated terminal region is configured as a source.

62. The article of claim 58, in which
the first designated terminal region is configured as a source; and
the second designated terminal region is configured as a drain.

63. The article of claim 58, in which
the gate structure has a shape with two oblong parallel lines interconnected by perpendicular segments that between them define islands,
the first designated terminal region is formed within at least one of the islands, and
a portion of the second designated terminal region is formed in a space outside the parallel lines.

64. The article of claim 58, in which
the first designated terminal region includes at least two portions that are separated by, and each is completely surrounded by, the gate structure, the two portions being coupled by a conductor.

65. The article of claim 58, in which
the first designated terminal region includes at least two portions that are separated by, and each is completely surrounded by, the gate structure, the two portions not being coupled by a conductor.

* * * * *